United States Patent
Sutter

(10) Patent No.: US 6,442,264 B1
(45) Date of Patent: Aug. 27, 2002

(54) TELEPHONE CALL ROUTER FOR TRANSFERRING DATA TO AND FROM DATA COLLECTION APPARATUS

(76) Inventor: Phillip R. Sutter, 1345 W. 17th St., San Pedro, CA (US) 90732

(*) Notice: Subject to any disclaimer, the term of this patent is extended or adjusted under 35 U.S.C. 154(b) by 0 days.

(21) Appl. No.: 09/126,287

(22) Filed: Jul. 30, 1998

(51) Int. Cl.[7] .......................... H04M 1/56; H04M 15/06; H04M 11/00; H04M 1/00

(52) U.S. Cl. .............................. 379/142.07; 379/93.05; 379/106.07; 379/142.06; 379/376

(58) Field of Search ..................... 379/142, 156, 379/157, 161, 164, 179, 182, 183, 193, 199, 106.01, 106.03, 106.07, 106.08, 106.11, 198, 210, 211, 93.05, 93.11, 93.14, 376

(56) References Cited

U.S. PATENT DOCUMENTS

| | | | | |
|---|---|---|---|---|
| 5,022,069 A | * | 6/1991 | Chen | 379/67 |
| 5,467,385 A | * | 11/1995 | Reuben et al. | 379/88 |
| 5,528,675 A | * | 6/1996 | Chen | 379/106 |
| 5,604,791 A | * | 2/1997 | Lee | 379/67 |
| 5,644,629 A | * | 7/1997 | Chow | 379/142 |
| 5,655,011 A | * | 8/1997 | Brown | 379/93.06 |
| 5,682,422 A | * | 10/1997 | Oliver | 379/107 |
| 5,737,400 A | * | 4/1998 | Bagchi et al. | 379/142 |
| 5,802,155 A | * | 9/1998 | Garland et al. | 379/106.09 |
| 5,841,845 A | * | 11/1998 | Garland et al. | 379/106.01 |

* cited by examiner

*Primary Examiner*—Binh Tieu
(74) *Attorney, Agent, or Firm*—Terrell P. Lewis

(57) ABSTRACT

A method and apparatus for selectively connecting different types of devices at a customer's premises to an incoming telephone call. A database of usage codes includes caller ID values and prioritization values for each type of device. A determination is made whether the outside line is being accessed by two or more of devices at the same time. If so, the prioritization values of the devices accessing the outside line are compared. The device with a higher prioritization value is then connected to the outside line. The devices can include telephones, modems, and data collection devices such as are used in the utility meter reading industry. A processor makes determinations, and connections to the devices are made via relays actuated by the processor. The apparatus detects, duplicates and uses an initial sequence of signal indicia associated with the incoming call representing a targeted call receiving device. This sequence can include caller ID indicia, and is compared with signal indicia stored in the database.

21 Claims, 3 Drawing Sheets

TELEPHONE CALL ROUTER FOR TRANSFERRING DATA TO AND FROM DATA COLLECTION APPARATUS

BACKGROUND OF THE INVENTION

1. Field of the Invention

The present invention relates generally to a method and apparatus for selectively routing or denying connections of incoming and/or outgoing telephone calls to and between telephone equipment, and more particularly to a method and apparatus for determining priority of connections, if any, to telephone equipment at a user's premises, and even more particularly to a method and apparatus for accessing data stored at one location in a data collection device, such as a data collection device installed on a user's premises, using apparatus located at a remote location, such as telephone dialing apparatus located at another endpoint of a public switched telephone network (PSTN).

2. Background of the Invention

Today, it is common to use various devices in the home or office, such as telephones, telephone answering machines, faxes, and data modems, to perform specific tasks in response a telephone call. When a call is directed to a home or office, the occupant(s) are typically alerted by actuation of a ringing mechanism least once before the device performs an automatic answer function.

One area of concern in the use of this technology involves security. Should the incoming call be allowed to access the telephone equipment in the home or office? Another area of concern involves privacy. Should the parties at the home or office be alerted or disturbed before the incoming call is allowed to access the telephone equipment?

The ability to dial into a home or office without disturbing the occupants, or triggering devices such as answering machines, is extremely valuable, and many industries and uses can be contemplated. For example, there are people who wish to dial into their business for the purpose of monitoring operational aspects. And companies that provide equipment, such as weather instruments, video compression devices, etc., often wish to have remote access to the data being collected. And another large, and growing, industry is that of the utility companies.

In the utility industry, it is common practice to supply a product, such as gas, electricity, or water, to customers who are at scattered locations. A meter provided at the customer's location registers the amount of services or consumption used by the customer. Periodically, e.g., once each month or two, a utility company employee must visit each user's home or place of business, locate and read the meter, and record the reading. Such readings are used to determine the bill to be rendered to the customer. In order for the meter reader to gain access to the meter, he must be allowed into the home or place of business where the meter is located, and this necessitates that someone at the meter location be present at the time the meter reader visits the premises. Moreover, large labor costs are involved in hiring meter readers, meter reading itself is onerous and requires a great deal of walking and time, and it is easy for meter readers to make mistakes, and thus render an inaccurate bill to a customer.

A considerable savings in costs can thus be realized if data collection devices can be sampled automatically and the data transmitted to the provider using existing telephone lines running between provider and the locations where the data collection devices are installed.

Many of the systems known for automatically obtaining information from a remote location have been using existing common non-dedicated telephones as the communication medium for transferring the information. Such systems typically effect transfer of the information in response to a telephone call originated at another endpoint of the public switched telephone network (PSTN).

One advantage of using such non-dedicated lines is that the installation of additional communication lines is unnecessary. A benefit of transferring stored information to apparatus at the providers office pursuant to a call made by such apparatus is that a complex telephone answering system is not required at the data collecting station in order to insure that all incoming calls will be answered in an orderly and efficient manner.

Another advantage is that such a system can use selectively operable automatic devices at each of the locations where the data is being collected. However, such systems exhibit an offensive characteristic, namely the incessant ringing of the telephones in the data collecting location in response to telephone calls initiated by apparatus at another endpoint of the public switched telephone network (PSTN). Such ringing is often a most undesirable nuisance, and several techniques have been proposed to remedy this problem.

One arrangement disclosed in U.S. Pat. No. Re 26,331 to Brothman teaches the installation of special circuits at the telephone company central office that do not ring the bell in the telephones at the data-collecting end.

Another arrangement, disclosed in U.S. Pat. No. 3,902,016 to Blouch, includes an "auxiliary system" at the subscriber's premises which automatically cuts into an incoming telephone call to prevent ringing or other actuation of the telephone bell or other signal device until an additional number or series of numbers are inputted, at which time the telephone signaling device is actuated.

Still another arrangement, disclosed in U.S. Pat. No. 4,394,540 to Willis et al., includes a microprocessor, a telephone isolating device, a call answering device, a ring detector, an off-hook detector, a ring generator, a data transmitter-receiver device and a modem, and each day the telephone at the subscriber's premises is isolated from the telephone lines for a predetermined data access time. Any call made to the user's premises during the data access time is answered by this arrangement of components. A coded signal is sent out over the telephone lines by the arrangement for the purpose of determining the source of the call. If the call is from the central office, a coded reply signal is sent back and the arrangement transmits the data to the central office. If the coded reply signal is not returned, the arrangement generates ringing signals for activating the bell in the subscribers telephone. If the subscriber's telephone is picked up at any time during the data access time, it is immediately unisolated from the telephone line.

Another system for automatically and remotely collecting information from a subscriber's premises is disclosed in U.S. Pat. No. 4,833,618 to Verma et al. This system includes interface means for converting the collected information into data signals that can be recorded and a microprocessor for storing the signals and controlling the transmission of the information from the user's premises to the central location only at predetermined times through a telephone call from the user's premises.

A principal drawback to these known systems is that the telephone line at the subscriber's premises must be isolated at predetermined times of the day so that the collected information can be accessed at that time.

Further, if the subscriber forgets the time and initiates a telephone call during that designated time period when data collection is taking place, the data collection is terminated and no further collection can take place until the next regularly scheduled data collection time period.

In addition, with any incoming call, there is an issue of whether to connect it with any of the telephone devices at the customer's premises. Apparatus for defeating hackers, delinquents or wrong numbers is desirable.

OBJECTS AND SUMMARY OF THE INVENTION

It is therefore an object of the present invention to provide a method and apparatus for determining priorities of incoming and outgoing telephone calls at a customer's premises as well as rendering the customer's telephone equipment and accessories secure from intrusion by hackers, account delinquents and unintentional intruders, while overcoming all the deficiencies and drawbacks of known similar methods and apparatus.

Still another object of the present invention is to provide a method and apparatus for remotely accessing previously collected data stored in apparatus at a subscriber's premises without disturbing line equipment currently accessing the subscriber's line.

Another object of the present invention to provide a method and apparatus which will selectively allow incoming telephone calls to have access to a different types of telephone usage equipment on the basis of caller ID component information associated with the incoming signals.

Still another object of the invention is to provide a method and apparatus for using caller ID information to route an incoming telephone call between conventional subscriber telephone equipment and other non-conventional phone line accessing equipment.

Another object of the present invention is to provide a method and apparatus for retrieving information stored in metering devices or other data collection devices by accessing the telephone system at the subscriber's location, but only when an on-hook condition in the entire telephone system is detected.

Still another object of the invention is to provide a method and apparatus for detecting caller ID signal indicia in the signal train associated with an incoming call, duplicate the caller ID signal indicia, and store it in processor means for later use to actuate ringing means associated with call receiving devices targeted by the caller ID signal indicia.

These and other objects of the invention are achieved by providing a method and apparatus for controlling the routing of incoming and outgoing calls among two or more telephone circuits when all the telephones in the user's premises are in an on-hook condition. The apparatus of the present invention includes hardware and software.

The hardware includes a housing having telephone line input connection ports, analog to digital signal conversion components, a microprocessor, and output connection ports. The hardware contains circuitry that couples the conversion components, as well as the input and output connection ports to the microprocessor.

The software comprises an algorithm embedded in the microprocessor. The algorithm determines conditions for which an incoming call can be connected (routed) to certain special equipment at an installation, or answered by conventional telephone equipment at the installation.

One feature of the invention is that the algorithm of the invention can determine that an incoming call is one which should be processed by the special equipment, and in such a case, the telephones in the installation will not ring. Another feature of the invention is that the algorithm can choose between devices connectible to the telephone line where there is a conflict between an incoming call and an apparent outgoing call.

DETAILED DESCRIPTION OF THE INVENTION

Figure 1:
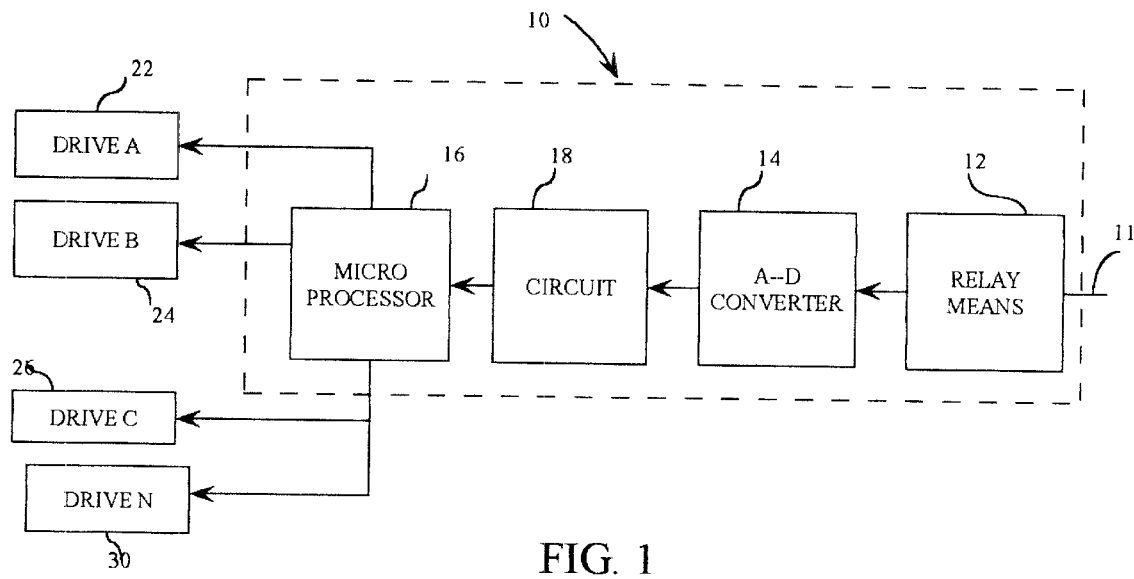
FIG. 1 is a schematic showing an example of components of which the apparatus 10 of the present invention may be comprised.

FIG. 1 depicts one representative arrangement of components of which the apparatus 10 of the present invention can be comprised. An outside telephone line 11 leads to the premises on which the apparatus of the invention has been installed. Relay means 12 detects line voltage representing an incoming call. An A-D converter 14 passes digitized signals to circuit 18 which determines whether the signal of the incoming call includes predetermined characteristics, such as caller ID or ring detect component information. In microprocessor 16, the algorithm of the invention is imbedded, and its functions are described in greater detail in connection with FIGS. 2–4.

Figure 2:
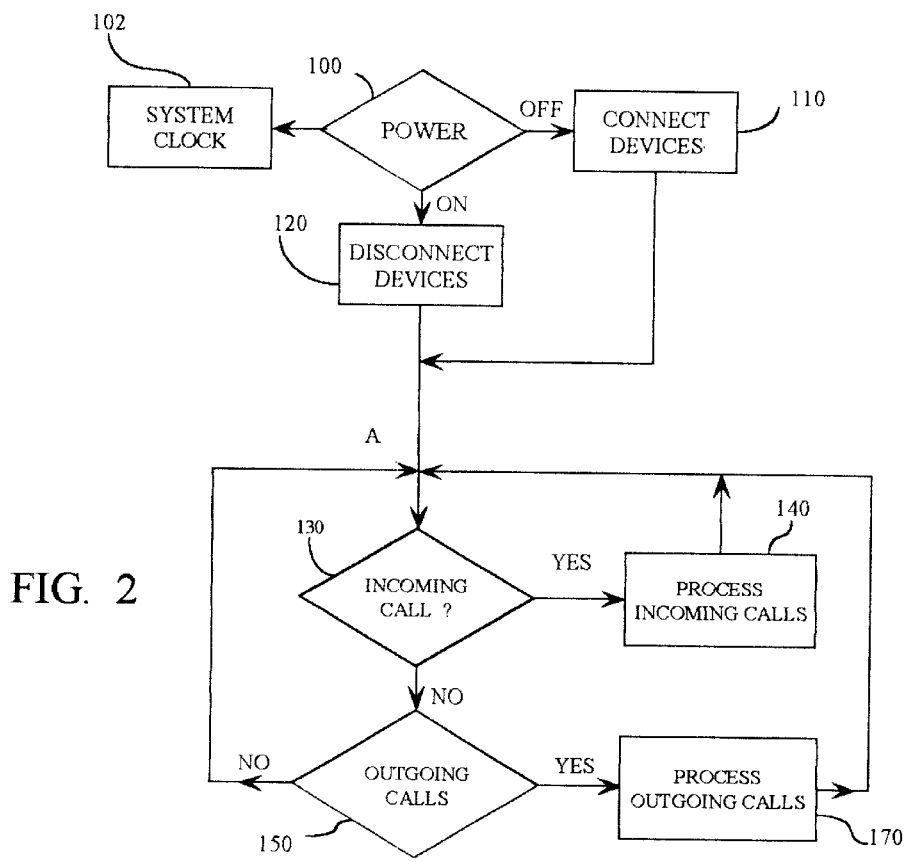
FIG. 2 is a master logic flow diagram for the algorithm of the present invention.

FIG. 2 is a master logic flow chart for the apparatus of the invention showing a first block 100 where, in conjunction with a system clock 102, the power status of the apparatus is queried. If power is not on, then operation of the apparatus is transferred to relays k(1), k(2) . . . k(n), depicted by block 110, which are then de-energized and all conventional devices in the home or office are connected to the telephone line for normal operation, If, in response to a power status inquiry, the power is determined to be on, then control of the apparatus is passed to block 120 at which point the relays k(1), k(2) . . . k(n) are energized to remove all devices in the home or office from the telephone line and place them under control of the microprocessor 16.

Next, the apparatus determines, at block 130, whether an incoming call is indicated by the ring detect circuit. If so, the process moves to block 140 where the incoming call is processed. If not, the process moves to block 150 where the apparatus determines whether an outgoing call is indicated on any connection by an on hook/off hook sensor. If an outgoing call is detected, the apparatus processes the outgoing call (block 170). If no outgoing call is detected, control of the process is passed back to block 130. Blocks 140 and 170 also pass control of the process back to point A.

Figure 3:
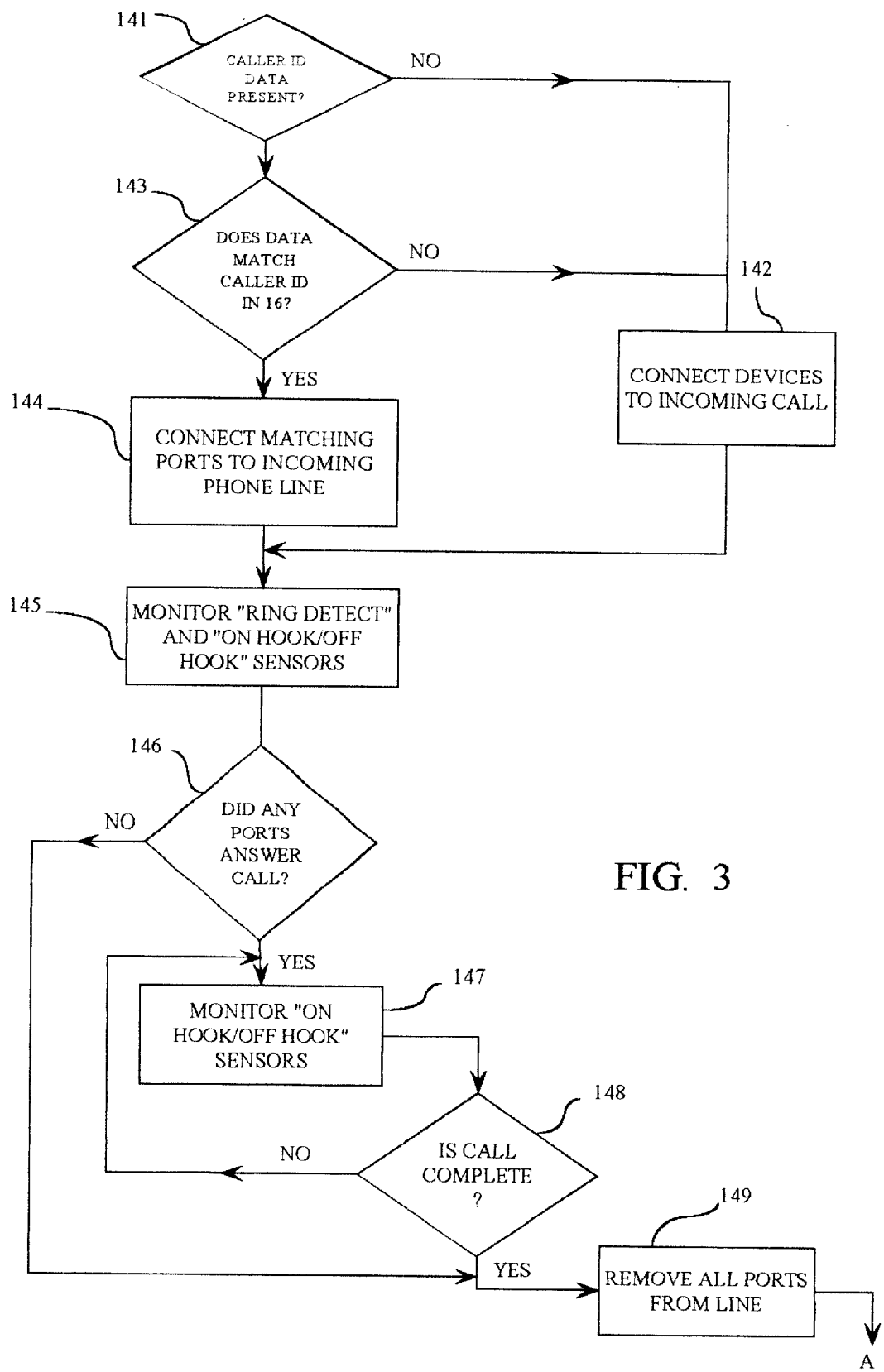
FIG. 3 is a logic flow diagram for the processing of an "incoming call" represented by block 140 shown in FIG. 2.

FIG. 3 is a flow chart of the logic steps that take place in block 140. In block 141, the logic determines whether caller ID signal indicia is presented with the initial ring burst from the telephone company. If no caller ID indicia is presented, the logic moves to block 142 where relays k(1) . . . k(n) associated with all ports not requiring a specific caller ID are de-energized, so that the devices connected to those ports can be connected to the incoming phone line. If caller ID signals are presented, the logic moves to block 143 where the caller ID signal train of the incoming call is compared with a caller ID signal train database contained within the microprocessor 16. Each caller ID signal train stored in the database may be associated with a specific port (or device connected to that port) that is allowed access to the phone line and a priority for its use of the phone line.

The logic at block 143 also determines whether the caller ID signal train presented with the incoming call "matches" any of the signal patterns in the database. If there is no match, the logic passes to block 142 where (as mentioned above) the devices at the customer's residence or business are connected with the incoming telephone line.

If there is a "match", the logic moves to block 144 where the telephone port that bears the matching caller ID signal indicia is enabled so that any devices coupled to that port can detect the "ring" signal indicia and answer the call depending on a priority value assigned to each device. Whether a device is permitted to answer the call depends on the priority value assigned to it and the values assigned for a "match" or a "no match". For example, conventional telephones at the customer's residence or place of business could be assigned "NULL" values and enabled on all incoming calls when a "no match" determination has been made after comparison with the caller ID values in the database.

Having thus determined which of the devices at the destination are to be enabled, the logic then moves to block 145 where "ring detect" and "on hook/off hook" sensors are monitored, and then to block 146 where a determination is made as to whether any of the enabled port(s) have answered the incoming call.

If the call has been answered, the logic moves to block 147 where the system monitors the "on hook/off hook" sensor to determine if, within a predetermined time period measured on the system clock, the call is completed.

If no completion is detected, the clock "resets" and the logic loops back to block 147 where system "monitoring" continues through another clock cycle. If the call does complete within the window of time set by the system clock, the logic moves to block 149 where the relays k(1) . . . k(n) are re-energized to remove all of the ports from the telephone line, and the logic then passes to back to point A in FIG. 2.

Figure 4:
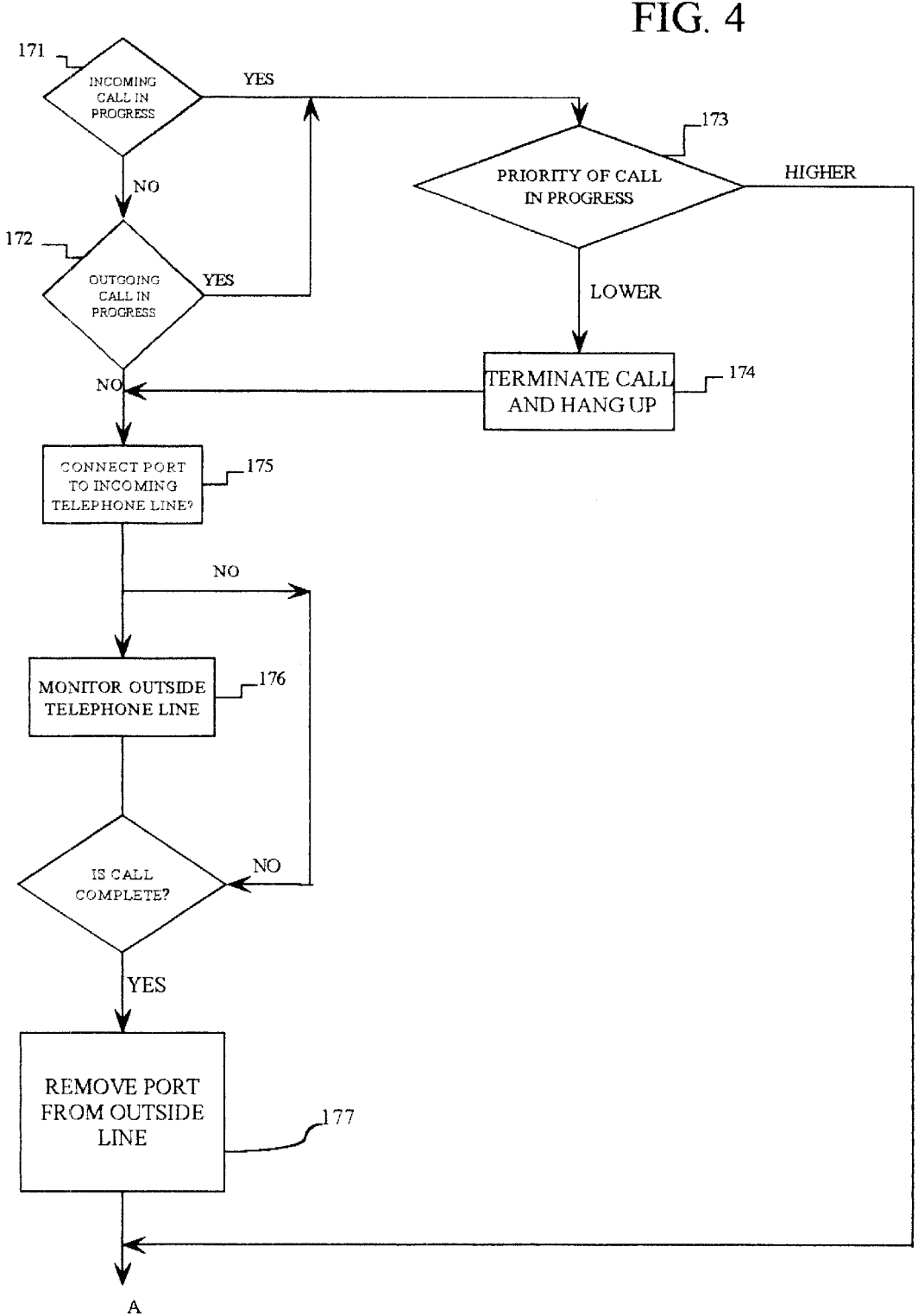
FIG. 4 is a logic flow diagram for the processing of an "outgoing call" represented by block 170 shown in FIG. 2.

FIG. 4 is a flow chart of the logic steps that take place in block 170. In block 171, a determination is made whether there is an incoming call in progress. If not, the logic moves to block 172 where a determination is made whether an outgoing call is in progress. If, at either of blocks 171 or 172, a determination is made that a call (incoming or outgoing) is in progress, then the logic moves the process to block 173 where the system determines whether the call in progress is of a lower priority than the new outgoing call. This prioritization is accomplished by comparing the priorities assigned to the respective ports, with the understanding that ports given higher priorities will be connected to an outside telephone line before ports assigned a lower priority. If the port from which a call in progress has been initiated has a higher priority assigned to it than the port from which a newly initiated outgoing call is made, then the newly initiated outgoing call will not be able to access the outside telephone line.

If, on the other hand, the priority of the newly initiated call is higher than the priority of the outgoing call, the logic moves the process to block 174 where the system de-energizes the relay associated with the port having the call in progress so that call can be terminated and the phone line can go "on hook". The system logic then passes to block 175 where the relay for the port requesting the outgoing call is de-energized so that port can be connected to the incoming telephone line. The system logic moves next to block 176 where the outside telephone line is monitored to determine if the call completes. Once the call has been completed, then the logic advances (block 177) to cause the relay to be re-energized to remove the port from the telephone line. If the call has not ended, then after a predetermined time interval measured by the system clock, the system reestablishes the monitoring mode it is repeated until the call is completed. Thereafter, control of the process is dictated by the master logic flow diagram shown in FIG. 2.

In the case of utility meters that include remotely accessed data storage devices, typically a call will be placed to a customer to collect the readings. The inventive apparatus will receive the call, identify caller ID indicia, and then compare it to the stored database of caller ID information. Each stored caller ID value is associated with a specific port (device) that it allows access to and a priority for its use of the phone line. When there is a match, the apparatus will enable whatever port corresponds to the detected caller ID value so that the device on that port will "hear" the ring and answer the call. Ports without any caller ID data information will be enabled on all incoming calls where the caller ID data matches none of those stored in the database. Any incoming calls with a caller ID component matching the meter reader would be routed to the meter reader, and all others would ring the customer's telephone(s). The invention offers inherent security since only the utility company owns the caller ID data component which will enable the meter reader.

It should be noted that the initial segment of signal information carried by an incoming telephone call typically bears the caller ID data component, or "key" component. In conventional caller ID equipment, the "key" is "used up" and eliminated once the incoming call signal is detected. The present invention, however, upon detecting a "key", then duplicates and stores it in memory. The "key" is compared with the stored caller ID values in the database to determine if there are any matches, and if so, the key is "fetched" and attached to the initial segment of a signal train forwarded the port or device identified after making the match. In this way, when the signal train reaches the targeted "matched" device, the "key" can be detected at the device so that a caller ID reader at the device can determine the telephone number or originator of the call.

The apparatus and method of the present invention also has utility for other interests, such as weather stations, seismic data collection agencies, traffic control centers, and remote diagnostic companies.

The present invention not only defines a method for routing incoming calls to specific devices, but also defines a method for arbitrating access to the phone line when "contention" or conflict occurs. Only two types of conflict are possible:

1. An outgoing user wishes to place a call when an incoming call is in progress.

2. Two outgoing users wish to place a call at the same time.

The priority associated with each port allows the invention to "arbitrate" phone line access in favor of the highest priority. Multiple ports of the same priority are handled on a "first come, first served" basis.

The present invention is also useful in preventing connection of an incoming call to the telephone equipment at the customer's premises when the incoming call bears caller ID component values that do not match caller ID component values associated with the telephone equipment installed at the customer's premises. This can be accomplished by comparing an initial sequence of signal characteristics associated with said incoming call go with usage codes and other data associated with the communication equipment at the customer's premises, and determining, based on such comparison, if any matches occur. If there are matches, the corresponding communication device(s) can be connected to the incoming call. If there are no matches, the incoming call is denied access to any of the communication devices at the customer's premises.

Those skilled in the art will appreciate that various changes and modifications of the invention described above can be made without departing from the scope and spirit of the invention. Therefore, it is to be understood that within the scope of the appended claims, the invention may be practiced other than as specifically described herein.

What I claim is:

1. Apparatus for selectively routing an incoming telephone call to at least one of a plurality of call receiving devices selected from a group of communication devices of a first "conventional" class, such as a telephone, a modem, or a facsimile machine, and a second "non-conventional" class, such as a data collection and transmitting device, both classes of call receiving devices being located at a customer's premises, said apparatus comprising:

customer alarming means for alerting a customer of an incoming call bearing signal indicia identifying one or more of said devices as a target, said signal indicia including caller ID indicia and a component for accessing a prioritization code residing in said memory means, means for detecting an initial sequence of signal characteristics in said signal indicia associated with the incoming call, said initial sequence indicating a particular targeted subset of targeted call receiving devices, means for selectively transferring said incoming call to one of the groups of call receiving devices at the customer's premises depending on whether said initial sequence of signal characteristics correspond with coded information associated with any of said devices in said first or second classes of communication devices, said call transferring means including memory means for storing a database of signal characteristics in said apparatus, means for comparing said signal characteristics of said incoming call with said signal characteristics in said database, and means for determining whether the signal characteristics match said one set corresponding to the call receiving device of said second type, said call transferring means deactivating said alarming means when said determining means indicates a match with said set of data, and means for comparing each of said prioritization codes of devices that have been accessed, and means for determining, based on the hierarchy of said codes, which are said devices are to be. enabled And in what order.

2. The apparatus of claim 1, and further including means for replicating said initial sequence of signal characteristics and means for adding said replicated sequence of signal characteristics to said data base for use at a later time.

3. The apparatus of claim 2, wherein said initial sequence of signal characteristics comprises caller ID signal indicia.

4. The apparatus of claim 2, wherein said initial sequence of signal characteristics is attached to a signal train sent to said targeted devices.

5. The apparatus of claim 4, wherein said initial sequence of signal characteristics comprise caller ID signal indicia.

6. The apparatus of claim 1, and further including means for disconnecting any device from said incoming telephone line port which does not have a priority greater than the priority for devices on the customer's premises.

7. The apparatus of claim 1, and further including means for preventing connection of said incoming call to any of said classes of communication devices when said caller ID indicia fails to correspond with coded data associated with said devices.

8. A method for selectively routing an incoming telephone call to one or more call receiving devices of a first conventional type, including telephone equipment, a modem or a facsimile machine, or of a second, non-conventional type, including a data collection and transmitting device, both the first and second types of call receiving devices being located at a customer's premises, said method comprising:

detecting an initial sequence of signal characteristics associated with the incoming call, said initial sequence including caller ID indicia as well as a sequence for accessing a prioritization code and indicating a targeted call receiving device, transferring said incoming call to one of the first or second types of call receiving devices at the customer's premises, said step of transferring said incoming call including a step of comparing said initial sequence of signal characteristics with a database of signal characteristics stored in a memory means in said apparatus, one set of the stored signal characteristics corresponding with a call receiving device of the second type, and determining, based on the caller ID indicia, which of the devices are to be enabled and in what order, said call transferring means deactivating an alarming means when said initial sequence indicates that the incoming call is intended for the second type of call receiving device, and alarming the customer of the incoming call when the initial sequence of said incoming call indicates that the call is to be received by a call receiving device of the first type.

9. The method of claim 8, wherein said step of transferring said incoming call further comprises determining whether the signal characteristics of said incoming call match said one set of signal characteristics corresponding to the call receiving device of said second type.

10. The method of claim 9, and further including the step of deactivating said alarming means when a match has been determined to have occurred.

11. The method of claim 8, wherein said signal characteristics comprise caller ID indicia.

12. A method for selectively connecting first or second types of communication devices at a customer's premises to an outside telephone line, the first type of communication device being of a conventional kind, including telephone equipment, a modem or a facsimile machine, and the second type of communication device being a non-conventional kind, including a remotely accessed data collection device, said second type of communication device having an ID code associated therewith, said method comprising:

assigning prioritization codes to each type of device and storing said codes in memory means, detecting, on said outside telephone line, an incoming call and identifying an initial sequence of signal characteristics indicating a targeted communication device, determining, at the customer's premises, which devices are accessing the outside telephone line, comparing the prioritization codes of any said ones of said devices residing in said memory means, and determining based on the hierarchy of said codes which of said devices are to be enabled and in what order, and preventing communication devices of the second type from accessing said outside telephone line when any of the communication devices of the first type are accessing the outside line.

13. The method of claim 12, and further including a step of disconnecting any device from said incoming telephone line port which does not have a prioritization value greater than the prioritization value of devices on the customer's premises.

14. Apparatus for selectively connecting different types of devices at a customer's premises to an outside telephone line, comprising:

means for receiving signals associated with an incoming call;

means for identifying and replicating caller ID signal indicia associated with said incoming call;

processor means including memory means for storing a database of usage codes associated with a respective type of device, means for determining whether two or more of said devices are accessing the outside line at the same time, first means for comparing the usage code of each said device accessing the outside line, and means for connecting the device assigned a higher usage code to the outside line, said means for connecting said device assigned a higher usage code to the outside line includes means for second means for comparing said signals associated with said incoming call to said usage codes, and means for determining whether the caller ID signals correspond to any of the devices accessing the outside telephone line.

15. The apparatus of claim 14, wherein said usage code includes caller ID signal indicia.

16. The apparatus of claim 15, wherein said usage code includes a prioritization code.

17. The apparatus of claim 15, wherein said processor means further includes means for replicating said caller ID signal indicia.

18. The apparatus of claim 17, wherein said means for replicating said caller ID signal indicia includes means for attaching said replicated caller ID signal indicia to a device access signal, so that when the targeted device is accessed, the call initiator can be identified.

19. The apparatus of claim 18, wherein said device access signal also includes said prioritization codes.

20. The apparatus of claim 14, wherein the devices at the customer's premises which can be connected to the outside telephone line comprise one or more of the group of devices including conventional telephones, modem devices, telephone answering machines, facsimile machines and remotely accessed data collection devices.

21. The apparatus of claim 20, wherein said modem devices are contained within the apparatus connected to said outside telephone line.

* * * * *